United States Patent [19]

Muller

[11] Patent Number: 5,019,469
[45] Date of Patent: May 28, 1991

[54] PROCESS FOR PRODUCTION OF AN ELECTROCHEMICAL SUB-ASSEMBLY COMPRISING AN ELECTRODE AND AN ELECTROLYTE, AND THE SUB-ASSEMBLY OBTAINED IN THIS WAY

[75] Inventor: Daniel Muller, Pau, France

[73] Assignees: Societe Nationale Elf Aquitaine, Courbevoie, France; Hydro-Quebec, Montreal, Canada

[21] Appl. No.: 519,464

[22] Filed: May 7, 1990

Related U.S. Application Data

[62] Division of Ser. No. 333,625, Feb. 21, 1989, Pat. No. 4,968,319.

[30] Foreign Application Priority Data

Jun. 18, 1987 [FR] France ............... 08539
Jun. 16, 1988 [WP] PCT Int'l.
    Appl. ............ PCT/FR88/00314

[51] Int. Cl.$^5$ .................................. H01M 6/18
[52] U.S. Cl. ........................... 429/192; 429/212
[58] Field of Search ........... 429/192, 191, 212, 209, 429/194, 190; 252/62.6, 182.1

[56] References Cited

U.S. PATENT DOCUMENTS

| | | |
|---|---|---|
| 3,314,820 | 4/1967 | Smith . |
| 4,216,276 | 8/1980 | Weddigen et al. ............ 429/104 |
| 4,303,748 | 5/1981 | Armand et al. ............... 429/192 |
| 4,505,081 | 3/1985 | Armand et al. ............... 429/192 |
| 4,542,081 | 3/1985 | Armand et al. ............... 429/192 |
| 4,556,614 | 12/1985 | Mehaute et al. ............. 429/191 |
| 4,556,616 | 12/1985 | Armand et al. ............... 429/192 |
| 4,578,326 | 3/1986 | Armand et al. . |
| 4,579,793 | 4/1986 | Armand et al. ............... 429/192 |
| 4,589,197 | 5/1986 | North ............................. 29/623.1 |
| 4,618,548 | 10/1986 | Brule ............................. 429/194 |
| 4,620,944 | 11/1986 | Armand et al. . |
| 4,654,279 | 3/1987 | Bauer et al. ................... 429/192 |
| 4,668,596 | 5/1987 | Shacklette et al. ........... 429/194 |
| 4,683,181 | 7/1987 | Armand et al. ............... 429/192 |
| 4,758,483 | 7/1988 | Armand et al. ............... 429/192 |
| 4,792,504 | 12/1988 | Schwab et al. ................ 429/192 |
| 4,818,644 | 4/1989 | Armand ......................... 429/192 |
| 4,824,746 | 4/1989 | Belanger et al. . |

FOREIGN PATENT DOCUMENTS

| | | |
|---|---|---|
| 0078505 | 5/1983 | European Pat. Off. . |
| 0145231 | 6/1985 | European Pat. Off. . |
| 2593328 | 7/1987 | France . |
| 2148586 | 5/1985 | United Kingdom . |
| 2149197 | 6/1985 | United Kingdom . |

OTHER PUBLICATIONS

Patent Abstracts of Japan, vol. 9, No. 248, Oct. 4, 1985, JP, A, 6097561 (Hitachi Seisakusho K.K.) May 31, 1985.

*Primary Examiner*—Anthony Skapars
*Attorney, Agent, or Firm*—Oblon, Spivak, McClelland, Maier & Neustadt

[57] ABSTRACT

The invention relates to an electrochemical sub-assembly comprising a positive electrode and a solid polymer electrolyte. The solid polymer electrolyte is composed of a salt in solution in a macromolecular material. The electrode is composed of the product of agglomeration in a composite mass of a material with ion conduction, composed of a salt in solution in a macromolecular compound of an electrochemically active material and an electron condutor material. The electrode and the electrolyte layers possess good adhesion to one another and do not possess any preferential orientation of the chains of the macromolecular material at the electrolyte/electrode interface.

6 Claims, No Drawings

PROCESS FOR PRODUCTION OF AN ELECTROCHEMICAL SUB-ASSEMBLY COMPRISING AN ELECTRODE AND AN ELECTROLYTE, AND THE SUB-ASSEMBLY OBTAINED IN THIS WAY

The present invention relates to a process for the production of an electrochemical sub-assembly, comprising a positive electrode and an electrolyte, and also the sub-assembly obtained in this way. This sub-assembly finds particular application for the production of complete electrochemical generators, of the type as described in the European Patent No. 013199, these generators essentially comprising a solid polymer electrolyte composed of a salt in solution in a macromolecular material, such as, for example, an ethylene polyoxide and/or one of its copolymers, and a composite positive electrode comprised of the product of agglomeration in a composite mass of a material with ion conduction, composed of a salt in solution in a macromolecular compound, of an electrochemically active material such as, for example, a vanadium oxide or titanium disulfide, and of an electron conductor material, such as, for example, carbon black.

These generators can be assembled in any manner, but they can also be assembled as described in the patent application filed on the same day by the same applicants and entitled: Multi-Layer Assembly for Carrying out Assembly of a Thin-Layer Generator, the Process of Manufacture of this Assembly and Production of the Complete Generator, and the Generator Obtained in this Way.

In order for such complete generators to demonstrate good performance, both electrochemically and mechanically, it is important that in the two-layer sub-assemblies comprised of the electrolyte layer associated with the positive electrode, the said layers possess good adhesion to one another and do not possess any preferential orientation of the chains of the macromolecular material at the electrolyte/electrode interface. In fact, such a preferential orientation of these chains can result in problems of de-lamination of the layers, in other words separation and loss of adhesion between the electrolyte and the electrode, which can result in phenomena of excess voltage at the electrodes during operation of the generator, and limits the possibilities of cycling of secondary generators.

On the other hand, during production of these sub-assemblies, it is necessary to avoid that the salt which is in solution either in the electrolyte, or in the electrode, and which can be identical in each of these layers or different, has an overly high concentration in one of these layers. In fact, such a variation in concentration can result in poor interpenetration of the polymer chains as well as precipitation of complexes rich in salt, this precipitation taking place in the unit in which the salt concentration is too high. These complexes, which are crystalline and poor ion conductors, result in a local loss of elasticity of the area around them and of its adhesiveness.

Finally, it is necessary that the sub-assembly obtained has good heat resistance, and, for example, that an elevation of temperature during the course of a process of assembly or during a final production phase of this two-layer sub-assembly does not cause the latter to deteriorate, which can happen when using a solvent whose solvent power increases with temperature.

The invention has the purpose of establishing a process which allows production of an electrochemical sub-assembly of the type described above, which meets the conditions stated above.

For this, the invention provides a process for production of a two-layer electrochemical electrolyte/electrode sub-assembly comprising, in the form of thin films, a layer of a composite positive electrode composed of the agglomeration product of a composite mass of material with ion conduction, composed of a salt in solution in a macromolecular compound, of an electrochemically active material and an electron conductor material, and a layer of a solid electrolyte composed of a salt in solution in a macromolecular material with ion conduction, this process consisting of:

depositing one of the said layers onto a carrier, based on a liquid phase comprising the elements constituting this layer, implementing partial cross-linking of the layer deposited in this way, and, on this partially cross-linked layer, depositing the other layer based on a liquid phase comprising the elements constituting the said other layer, this latter liquid phase having the tendency to dissolve or swell the macromolecular material present in the layer first deposited on the carrier.

According to a first embodiment of the process, a layer of the liquid phase comprising the positive electrode is first of all deposited on the carrier, then after partial cross-linking of the said layer, a layer of the liquid phase comprising the elements of the solid electrolyte is deposited on the former, this latter liquid phase having the tendency to dissolve the macromolecular material of the composite positive electrode in the absence of cross-linking.

According to another embodiment of the process, a layer of the liquid phase comprising the solid electrolyte is first of all deposited on the carrier, then after partial cross-linking of the said layer, a layer of the liquid phase comprising the elements of the composite positive electrode is deposited on the former, this latter liquid phase having the tendency to dissolve the macromolecular material of the solid electrolyte in the absence of cross-linking.

If the macromolecular material with ion conduction which is part of the composition of the solid electrolyte and that of the composite positive electrode, is sufficiently fluid at working temperatures, for example a macromolecular material with a low molecular weight, to form a liquid mixture with the other elements comprising the solid electrolyte or the composite positive electrode, which can be used in the techniques of coating the substrate, such a mixture can be used for deposition of the layer in consideration.

Advantageously, the liquid phase based on which the solid electrolyte layer or the layer of the composite positive electrode is formed consists of a solution, or, if not all the products are soluble, of a dispersion of the elements comprising either the solid electrolyte or the composite positive electrode, in a solvent of macromolecular material with ion conduction present in the layer to be formed, and of a salt in solution in the said macromolecular material, the formation of the said layer taking place by application of the corresponding solution or suspension onto the carrier or the other layer, as the case may be, followed by evaporation of the solvent.

Preferably, the same solvent is used to form the liquid phases which serve to form the solid electrolyte layer and the composite positive electrode layer, respectively.

As the solvent, one can advantageously use an organic compound which can vaporize, capable of dissolving both the macromolecular material or materials with ion conduction and the salt or salts in solution in the said macromolecular material or materials. Preferably, the solvent used has a boiling point below 140 degrees C.

According to a particular embodiment, deposition of the second layer is followed by a step of partial cross-linking of this layer.

Partial cross-linking of the layer deposited on the carrier and possibly of the other layer can be carried out by any known method, for example cross-linking by photochemical cationic catalysis, cross-linking by irradiation by a flow of electrons or other energy radiation, cross-linking by chemical reaction which creates bridges such as urethane, ester, siloxane, aluminoxane bridges. Preferably, cross-linking by a thermal method is used, in other words by elevation of the temperature in the presence of a cross-linking agent, particularly a chemical generator of free radicals, thermally activated, the said cross-linking agent being present in the liquid phase used to form the layer subjected to cross-linking. Such an elevation in temperature can be used for evaporation of the solvent when the liquid phase used for deposition of the electrolyte layer or the composite positive electrode layer contains one. The chemical generators of free radicals which can be used for the said thermal cross-linking can be particularly peroxides, such as benzoyl peroxide, lauryl peroxide, dicumyl peroxide or also azobisnitrile compounds such as azobisisobutyronitrile.

Partial cross-linking according to the invention is classical cross-linking which creates bridges between the molecular chains. This cross-linking effect depends on the number of sites which can be cross-linked and the number of free radicals or the grouping responsible for bridges, and therefore on the period of cross-linking, on the temperature as well as the concentration of the generators of free radicals or groupings which provide bridges, or also on the intensity of energy radiation in the case of cross-linking by irradiation. For each particular case, these parameters will be determined in such a manner as to obtain the desired degree of partial cross-linking. In particular, in the case of the layer first deposited on the carrier, it is important to make sure that cross-linking of the said layer is not too great, before the second layer is applied. In fact, overly strong cross-linking will create poor interpenetration of the polymer of the second layer, because the polymer of the first layer will be in the form of a compact network. Such dense cross-linking will therefore result in a loss of suppleness and a loss of adhesion of the two layers relative to one another, which could be detrimental for any use of the two-layer sub-assembly in a subsequent transfer technique.

On the other hand, if a first layer which has not been cross-linked is used to deposit the second layer, the situation is one of molecular disorganization due to dissolution of the polymer molecules of the first layer by the liquid or fluid components of the second layer. Such an absence of cross-linking will also result in flow, particularly under heat, with this flow effect increasing with time. A possible phenomenon of separation of the layers must also be feared. Furthermore, absence of cross-linking will result in a lesser range of plastic deformation, which can be very detrimental for secondary generators, because there will be no effect of compensation for volume variations during cycling.

The carrier used to deposit the first layer can be composed either of a metallic material produced in the form of thin films, for example a slightly ductile material such as aluminum, but it can also be comprised of a plastic material, this plastic material demonstrating good adhesion with regard to the electrolyte, or partial adhesion, or poor adhesion. The choice of the quality of adhesion depends on the sequence of operations which are to be carried out, and on the fact whether or not the two-layer electrode/electrolyte sub-assembly is to be removed from the carrier.

The invention also concerns an electrochemical sub-assembly produced according to the preceding process. For this, the invention provides an electrochemical sub-assembly comprising, in the form of thin films, a layer of a composite positive electrode composed of the agglomeration product in a composite mass of material with ion conduction, composed of a salt in solution in a macromolecular material, an electrochemically active material and an electron conductor material, and of a solid electrolyte layer comprised of a salt in solution in a macromolecular material, this sub-assembly being characterized by the fact that it presents a continuum between the macromolecular material of the positive electrode and that of the electrolyte.

This continuum is characterized by the fact that the macromolecular material with ion conduction of the electrolyte, and that of the electrode, form interpenetrating polymer structures in it.

During implementation of the process according to the invention, the fact of only cross-linking the first layer partially and of using a liquid phase for deposition of the second layer, which is also a solvent for the first layer, makes it possible to obtain at least partial swelling of the macromolecular material of the first layer, without disorganization of the latter. Therefore better penetration of the chains of the second layer and anchoring of these chains in the polymer chains of the first layer is achieved, since these chains of the second layer which are contained in the liquid phase containing them and in which the macromolecular material of the first layer is also soluble are practically in intimate contact with the macromolecular chains of the material of the first layer. At the end of the operation of forming the second layer on the first, and particularly during evaporation of the solvent, if one is used, a consistent continuum and an interpenetrating polymer structure is obtained at the interface of the said layers.

As indicated above, once the second layer has been deposited on the first, one can proceed with a second partial or complete cross-linking. At the interface of the two layers, this cross-linking therefore takes place at the chains which are already interpenetrated and consists of co-cross-linking, which reinforces the physical continuum uniting the two layers, the said continuum making separation of the two layers almost impossible.

This physical continuum to which the chemical continuity connected with the chemical nature of the macromolecular chains of each layer is added makes it possible to obtain a random orientation and a good bond between the macromolecular chains, something which cannot be obtained by using, for example, a pressing method or heat co-lamination method for production of the two-layer sub-assembly.

The process of spreading according to the invention makes it possible to obtain two-layer sub-assembly which, when used for the assembly of secondary generators, make possible a significant increase in the number of cycles, a reduction in the thickness of the electrolyte, particularly the critical thickness at which dendritic phenomena appear during charge and discharge cycles. These two-layer sub-assemblies obtained according to the invention also make it possible to increase the useful capacities relative to the installed capacities, as well as an increase in available power. Furthermore, these sub-assembly demonstrate mechanical properties which make it possible to plan transfer of them onto metallic films, such as lithium, under strong pressure, which makes it possible to obtain good adhesion, without any short-circuit phenomena appearing, which property is important even for very low thicknesses of the electrolyte.

The invention will be better understood when reading the following examples, which are given as an illustration and are not limiting in any way.

FIRST SERIES OF EXAMPLES

A lithium electrochemical generator has been produced according to four different methods, specifically a method according to the invention and other methods according to prior art, the said generator having the following characteristics:

(a) Electrolyte: The electrolyte is a solid polymer electrolyte with a thickness of 20 microns, composed of a solution of lithium perchlorate in a copolymer of ethylene oxide and allyl glycidyl ether at 80% by weight of ethylene oxide, the perchlorate being present in a ratio of 7% by weight in the copolymer. The molecular weight of the copolymer is on the order of 100,000 (viscosimetric molecular weight).

(b) Positive electrode: The positive electrode is a composite electrode base on titanium disulfide, carbon black and a polymer electrolyte with the same composition as above. The thickness of this electrode is such that it allows deposition equivalent to 2 Coulomb per square cm, in other words 11.6 g per square m of titanium disulfide.

(c) Negative electrode: The negative electrode is comprised of a lithium sheet with a thickness of 75 microns.

FIRST METHOD

Preparation of the elements separately.

(a) Preparation of the electrolyte: Using a mold, a solution, in acetonitrile, of a mixture of copolymer and lithium perchlorate in a ratio of 7 g perchlorate for 100 g copolymer is spread onto a film of polyethylene or polypropylene. The unit is then dried in pulsating air at 80 degrees C. for 5 to 10 minutes, and a transparent film of solid electrolyte is obtained, with a thickness of 20 microns, on the polypropylene film.

(b) Production of the positive electrode: The positive electrode is produced on a film of aluminum with a thickness of 20 microns, by induction to the mold of a suspension of titanium disulfide and carbon black in the solution of the above-mentioned electrolyte, in such a way as to obtain a composite mass containing approximately 22 g per square m of titanium disulfide, after drying.

(c) Production of the two-layer sub-assembly: Using a press or a heating laminator, the unit of the positive electrode and the electrolyte is pressed at a temperature between 50 and 100 degrees C., with the restriction that the total thickness must be less than the sum of the thickness of the initial components by 10 microns.

The unit called a "half-battery" is obtained; it adheres sufficiently to the positive collector to allow removal of the polypropylene film having served as a carrier during production of the electrolyte. When this polypropylene film has been removed from the electrolyte, pressing of the lithium sheet onto the electrode/electrolyte sub-assembly is carried out in a second operation, at temperatures and pressures on the same order as for transfer of the electrolyte onto the electrode. Another method could consist of first proceeding to transfer the electrolyte carried on the polypropylene film onto a lithium film, then removing this polypropylene film and finally carrying out transfer of the lithium electrolyte unit to the positive, itself carried by a metallic film which comprises a collector.

The generators obtained according to this first method of production are cut off and subjected to cycling tests. It is found that at a cycling temperature of 30 degrees C., a cycling program equal to C/20, and capacity utilization in the vicinity of 30% for the first cycle, it is impossible to obtain more than three correct cycles, then the phenomena of the appearance of dendrites and adhesion losses are very rapidly observed. Furthermore, during assembly of the complete cells by lamination of the lithium film onto the two-layer electrolyte/electrode sub-assemblies, short-circuit phenomena are observed, which result in hot flow of the macromolecular material, which can be explained by the fact that the said material has not been cross-linked. Even when taking every precaution during assembly, a high rate of cells cannot be used because of permanent short-circuits.

SECOND METHOD (a) Production of the positive electrode: The exact same process which was used for production of the electrode described above is used, with the exception that before the suspension is spread into the mold, a free radical generator comprised of benzoyl peroxide in a ratio of 0.5% by weight relative to the polymer is added to the suspension.

Then a composite electrode analogous to the electrode of Example 1 is obtained, except that after drying for 5 to 10 minutes at a temperature between 80 and 100 degrees C., the copolymer is partially cross-linked due to the reaction of the allyl groups among one another in the presence of the free radicals resulting from heating of the benzoyl peroxide.

(b) On the other hand, a solution intended to obtain the solid electrolyte as described in the first process is prepared, with the exception that a free radical generator is added to the solution, which, in this particular case, is the same one as that used for the positive electrode. The said generator is used in a ratio of 0.5% by weight of polymer. The electrolyte solution is then spread onto the positive electrode produced previously, again using a mold. The sub-assembly is dried at 80 degrees C., and, as an illustration, it can be said that an non-detachable "varnish" is obtained by "painting" the positive electrode. The sub-assembly is then associated with a metallic lithium layer in the same manner as that explained in Example 1. The generators obtained in this way were cut to identical formats as those in the first example, and subjected to cycling tests. These cycling tests took place at a temperature of approximately 30 degrees C., and it was to carry out 320 cycles with a utilization rate of 50% of the installed capacity in the positive.

THIRD METHOD

An attempt was made to implement the same process as that described in the second method, but without using the cross-linking agent. It was found that during deposition of the electrolyte layer onto the positive electrode, destructurization of the positive electrode took place, and it was impossible to obtain a proper sub-assembly, due to partial dissolution of the electrode in the presence of the solvent of the second layer.

FOURTH METHOD

If one attempts to implement a process analogous to that described in the third method, but using an electrolyte solvent which is a poor solvent for the electrode material, for example methanol, numerous problems immediately occur during drying, because the temperature increase results in a dissolution of the positive electrode. To remedy this, it would be sufficient to utilize a free radical generator which would allow partial cross-linking of the electrode, according to the invention.

SECOND SERIES OF EXAMPLES

Several methods to produce an electrochemical generator were tried, where the electrolyte is identical to that of the first series of examples, but with a thickness of 60 microns, and the positive electrode comprises molybdenum dioxide with a capacity of 5 Coulomb per square cm and is deposited onto a metallic nickel film with a thickness of 5 microns. This positive electrode has a capacity of 66.5 g molybdenum oxide per square m.

FIRST METHOD

Using a method identical to the first method of the first series of examples, it is found that it is very difficult to obtain a proper assembly without the occurrence of short circuits, in spite of the relatively great thickness of the electrolyte, which is on the order of 60 microns. When, in spite of this, it was possible to obtain a generator capable of functioning, a utilization rate which decreased rapidly during the first cycles was observed. During utilization at 60 degrees C., with a program of C/12, dendritic phenomena appeared during recharging, from the fifth cycle on, in spite of the 60 micron thickness of the electrolyte.

SECOND METHOD

Using the spreading method in which the cross-linking agent is comprised of azobisisobutyronitrile (AZBN) used in a ratio of 0.5% by weight of copolymer and spreading a thickness of 40 microns of electrolyte on the positive electrode, and making secondary generators with the same size as above, it was found that it was possible to obtain discharges at more than 70% utilization, for a discharge speed of C/12 at 60 degrees C., this at a high number of cycles (165). During these cycles, no appearance of dendrites was observed, in contrast to the preceding example.

If the cross-linking agent had not been used in the positive, disorganization of the latter would have occurred, resulting in separation or local separation of the positive electrode from its collector due to certain local dissolution. These problems are resolved if one proceeds in the presence of free radicals in the positive electrode layer. In the absence of free radicals in the solid electrolyte layer, there are no particular spreading problems, but certain problems can appear if transfer takes place under heat, for example to a lithium sheet, these problems showing themselves by short-circuit effects due to flow effects.

I claim:

1. An electrochemical two-layer electrolyte/electrode sub-assembly comprising, in the form of thin films, a layer of a composite positive electrode composed of the agglomeration product in a composite mass of material with ion conduction, composed of a salt in solution in a macromolecular material, an electrochemically active material and an electron conductor material, and of a solid electrolyte layer itself comprised of a salt in solution in a macromolecular material, characterized by the fact that it presents a chemical and physical continuum between the macromolecular material of the positive electrode and that of the electrolyte at the interface of the positive electrode and electrolyte layers.

2. A sub-assembly according to claim 1, characterized by the fact that the said continuum is present in the form of two interpenetrating polymer structures, one of which is formed by the chains of macromolecular material of the composite positive electrode, and the other by the chains of macromolecular material of the solid electrolyte.

3. A sub-assembly according to claim 2, characterized by the fact that in the said continuum, the chains of one of the interpenetrating polymer structures are co-cross-linked to the chains of the other polymer structure.

4. A sub-assembly according to one of claims 1 to 3, characterized by the fact that one of the layers forms a unit with a carrier material.

5. A sub-assembly according to claim 4, characterized by the fact that the composite positive electrode layer forms a unit with a carrier consisting of a thin film of an electron conductor material, particularly aluminum or nickel.

6. A sub-assembly according to claim 4, characterized by the fact that one of the layers forms a unit with a carrier consisting of a film of polymer material which can be easily removed, such as polypropylene or polyethylene.

* * * * *

UNITED STATES PATENT AND TRADEMARK OFFICE
CERTIFICATE OF CORRECTION

PATENT NO. : 5,019,469

DATED : May 28, 1991

INVENTOR(S) : Daniel Muller et al.

It is certified that error appears in the above-identified patent and that said Letters Patent is hereby corrected as shown below:

On the title page, item [75] Inventor: should read as follows:

--Daniel Muller; Jean-Michel Chabagno, both of Pau, France;

& Michel Duval, Montreal, Canada--.

Signed and Sealed this

Seventeenth Day of November, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO.    : 5,019,469
DATED         : May 28, 1991
INVENTOR(S)   : MULLER ET AL

It is certified that error appears in the above-identified patent and that said Letters Patent is hereby corrected as shown below:

At column 6, line 30: "result in" should read: --result from--;

line 60: "using a mold" should read: --by doctor blade coating-- lines 61 and 62: "that an non-detachable "varnish" is obtained by "painting" the" should read: --that there is obtained a "varnish" that cannot be peeled away from the "painting" of the--

At column 7, line 1: "it was" should read: --it was possible--.

UNITED STATES PATENT AND TRADEMARK OFFICE
CERTIFICATE OF CORRECTION

PATENT NO. : 5,019,469

DATED : May 28, 1991

INVENTOR(S) : MULLER ET AL

It is certified that error appears in the above-identified patent and that said Letters Patent is hereby corrected as shown below:

At column 2, line 9: "product of a composite" should read: --product in a composite--;

At column 4, line 50: "a consistent continuum and an" should read: --a continuum consisting of an--;

At column 5, line 38: "base" should read: --based--;

line 60: "induction to the mold" should read: --doctor blade coating--;

Signed and Sealed this

Twenty-third Day of March, 1993

Attest:

STEPHEN G. KUNIN

Attesting Officer          Acting Commissioner of Patents and Trademarks